United States Patent [19]
Adkins et al.

[11] Patent Number: 5,872,292
[45] Date of Patent: Feb. 16, 1999

[54] STABLE AROMATIC AMINE COMPOSITION, A PROCESS FOR PREPARING COLOR STABLE AROMATIC AMINES, AND THE PRODUCTION OF LIGHT COLORED AROMATIC AMINE-BASED POLYETHER POLYOLS

[75] Inventors: Rick L. Adkins, New Martinsville; Steven L. Schilling, Glen Dale; Keith J. Headley, Paden City, all of W. Va.

[73] Assignee: Bayer Corporation, Pittsburgh, Pa.

[21] Appl. No.: 788,788

[22] Filed: Jan. 24, 1997

[51] Int. Cl.$^6$ .................................................. C07C 209/90
[52] U.S. Cl. ................................... 564/5; 564/2; 528/421
[58] Field of Search ............................ 564/5, 2; 528/421

[56] References Cited

U.S. PATENT DOCUMENTS

| | | | |
|---|---|---|---|
| 2,549,056 | 4/1951 | Chenicek | 564/5 |
| 3,264,268 | 8/1966 | Muller et al. | 260/77.5 |
| 3,314,995 | 4/1967 | Cross et al. | 260/570 |
| 3,359,315 | 12/1967 | Kosak | 260/575 |
| 3,446,848 | 5/1969 | Aitken et al. | 260/584 |
| 3,462,492 | 8/1969 | Kober | 260/573 |
| 3,499,009 | 3/1970 | Odinak | 260/570 |
| 3,917,702 | 11/1975 | Hirosawa | 260/570 D |
| 4,122,035 | 10/1978 | Cislo | 252/414 |
| 4,209,609 | 6/1980 | Haas | 528/421 |
| 4,273,937 | 6/1981 | Gum et al. | 564/5 |
| 4,391,728 | 7/1983 | Korczak et al. | 252/182 |
| 4,421,871 | 12/1983 | Korczak et al. | 521/167 |
| 4,431,841 | 2/1984 | Malz, Jr. et al. | 564/398 |
| 4,562,290 | 12/1985 | Korchzak et al. | 564/399 |
| 4,751,331 | 6/1988 | Efford | 568/621 |
| 5,030,758 | 7/1991 | Dietrich et al. | 564/399 |
| 5,141,968 | 8/1992 | Dietrich et al. | 521/167 |

FOREIGN PATENT DOCUMENTS

| | | |
|---|---|---|
| 0614152 | 2/1961 | Canada ................ 564/5 |
| 298249 | 2/1992 | Germany . |
| 1073664 | 6/1967 | United Kingdom . |
| 1262995 | 2/1972 | United Kingdom . |
| 1311095 | 3/1973 | United Kingdom . |
| 1398185 | 6/1975 | United Kingdom . |
| 1526465 | 9/1978 | United Kingdom . |

OTHER PUBLICATIONS

Database WPI, Section Ch, AN 80–103881, XP002063321, & JP 01 050 810 A (UBE Ind Ltd.) Feb. 27, 1989.

*Primary Examiner*—Shailendra Kumar
*Attorney, Agent, or Firm*—Joseph C. Gil; N. Denise Brown

[57] ABSTRACT

This invention relates to stable aromatic amine compositions. These compositions comprise a) a compound selected from the group consisting of aldehydes, ketones, acetals and ketals, and b) an aromatic amine. This invention also relates to a process for stabilizing the color of aromatic amines, and to the use of these aromatic amines as initiators for the preparation of polyether polyols.

15 Claims, No Drawings

STABLE AROMATIC AMINE COMPOSITION, A PROCESS FOR PREPARING COLOR STABLE AROMATIC AMINES, AND THE PRODUCTION OF LIGHT COLORED AROMATIC AMINE-BASED POLYETHER POLYOLS

BACKGROUND OF THE INVENTION

This invention relates to a composition comprising an aromatic amine compound and a small quantity of a compound selected from the group consisting of aldehydes, ketones, acetals and ketals. The present invention also relates to a method for preventing the discoloration of aromatic amines, and to a process for the production of light colored aromatic amine based polyether polyols.

One of the problems or disadvantages associated with amine group containing compounds is the tendency of these compounds to discolor. Discoloration of some amine group containing compounds such as, for example, ortho-toluenediamine (o-TDA), darken immediately upon exposure to air, while others such as, for example, aniline, are more stable and darken slower over time. The aliphatic amine group containing compounds also discolor over time at room temperature, but generally speaking, these discolor at a much slower rate than the aromatic amine group containing compounds.

Amine group containing compounds are known to be suitable initiators for preparing polyether polyols. Various amine initiated polyether polyols and the process for their production are described in, for example, U.S. Pat. Nos. 3,264,268, 3,314,995, 3,446,848, 3,462,492, 3,499,009, 4,209,609, 4,391,728, 4,421,871 and 4,562,290, and as described in British Patents 1,073,664, 1,311,095 and 1,398,185.

The use of discolored amine group containing compounds as initiators in the production of polyether polyols results in the polyether polyols also being discolored. The dark color of the resultant polyether polyols is irreversible. Therefore, a means of preventing discoloration of amine group containing compounds and/or reducing the color of polyether polyols started from amine group containing compounds are commercially desirable.

One way of avoiding/preventing discoloration of these amine group containing compounds and polyether polyols prepared from these compounds, is to immediately form polyether polyols from the amine group containing compounds after distillation, before they come into contact with air. This, however, requires that the amine group containing compounds and the resultant polyether polyols be produced in the same plant, with no time lapse between the point of distilling the amine containing compounds and when these are used as initiators to form polyether polyols. Otherwise, stringent engineering measures are required to ensure that the amine compounds are oxygen-free at all points in the process between the time they are purified and used. Currently, it is necessary to keep the entire process totally under nitrogen to prevent and/or minimize this discoloration.

In accordance with the present invention, it was found that the addition of a relatively small quantity of certain groups of compounds to aromatic amine compounds surprisingly formed compositions which are stable against discoloration. This is true even after storing the treated aromatic amine compositions in a 100° C. oven for 4 weeks. Polyether polyols can then be produced from these treated aromatic amine compounds, without the derogatory color effects one would normally expect.

SUMMARY OF THE INVENTION

This invention relates to stable aromatic amine compositions comprising:

a) from 0.001 to 5% (preferably 0.01 to 1%, most preferably from 0.1 to 0.5%) by weight, based on 100% by weight of component b), of one or more compounds being selected from the group consisting of aldehydes, ketones, acetals, ketals and mixtures thereof, and b) at least one aromatic amine group containing compound.

The present invention also relates to a process for stabilizing the color of an aromatic amine group containing compound. This process comprises 1) adding a) from 0.001 to 5% (preferably 0.01 to 1%, most preferably from 0.1 to 0.5%) by weight, based on 100% by weight of component b), of one or more compounds selected from the group consisting of aldehydes, ketones, acetals, ketals and mixtures thereof, to b) at least one aromatic amine group containing compound. Ortho-toluenediamine is a preferred aromatic amine in which discoloration can be prevented or minimized by adding a small quantity of one of these compounds.

The present invention also relates to a process for the production of stable, light colored aromatic amine-based polyether polyols comprising alkoxylating an aromatic amine group containing compound, wherein said aromatic amine group containing compound has been treated with from 0.001 to 5% by weight, based on 100% by weight of the aromatic amine group containing compound, with one or more compounds selected from the group consisting of aldehydes, ketones, acetals, ketals and mixtures thereof. The addition of a small quantity of a compound selected from the group consisting of aldehydes, ketones, acetals and ketals is effective in preventing or minimizing the discoloration of aromatic amine group containing compounds, and thereby allows light colored polyether polyols to be produced therefrom.

DETAILED DESCRIPTION OF THE INVENTION

As used in the present invention, the term stable with respect to the aromatic amine compositions of the present invention means that the color of these is lighter than the standard when stored for at least 4 weeks at a temperature of $\geq 25°$ C. The standard is the corresponding untreated aromatic amine.

In accordance with the present invention, suitable compounds for treating aromatic amines to prevent discoloration are selected from the group consisting of aldehydes, ketones, acetals, ketals and mixtures thereof. Suitable compounds can be aliphatic (i.e. cyclic or acyclic), or aromatic (including benzylic). Some examples of such compounds include formaldehyde, paraformaldehyde, trioxane, acetaldehyde, butyraldehyde, glutaraldehyde, benzaldehyde, acetone, dimethoxymethane, salicylaldehyde, glyoxal, metaldehyde, propionaldehyde, 2-methylpropanal, pentanal, 3-methylbutanal, hexanal, heptanal, octanal, phenylacetaldehyde, o-tolualdehyde, p-tolualdehyde, p-hydroxybenzaldehyde, p-methoxybenzaldehyde, methyl alkyl ketones such as, for example, methyl ethyl ketone, methyl propyl ketone, methyl isopropyl ketone, methyl isobutyl ketone, methyl sec-butyl ketone, methyl hexyl ketone, etc., dialkyl ketones such as, for example, diethyl ketone, diisopropyl ketone, diisobutyl ketone, ethyl propyl ketone, butyl ethyl ketone, ethyl amyl ketone, etc., unsaturated ketones such as, for example, methyl vinyl ketones, methyl isopropenyl ketone, mesityl oxide, isomesityl oxide, etc., diketones such as, for example, 2,3-butanedione, 2,3-pentanedione, 2,5-hexanedione, etc., cyclic ketones including, for example, cyclopentanone, cyclohexanone, cyclopentanone, 3,3,5-trimethylcyclohexanone, etc., aromatic ketones such as, for example, acetophenone, benzophenone, propiophenone, etc. Other suitable acetals and ketals include, for example, 1,1-dimethoxyethane, triethyl orthoformate, triethyl orthoacetate, 1,3-dioxolane, 2-methyl-1,3-dioxolane, 1,3-dioxane, 2,2-dimethyl-1,3-dioxolane, solketal, benzaldehyde dimethylacetal, etc.

It is preferred that this compound be selected from the group consisting of formaldehyde, paraformaldehyde, trioxane, acetaldehyde, butyraldehyde, glutaraldehyde, benzaldehyde, acetone and dimethoxymethane.

Aldehydes suitable for the present invention may be prepared by any of the known processes in the art. Examples of suitable processes are described in, for example, *Kirk-Othmer Encyclopedia of Chemical Technology,* Fourth Edition, Volume 1, pp. 932–933, the disclosure of which is herein incorporated by reference. Processes for preparing ketones suitable for the present invention include those described in, for example, *Kirk-Othmer Encyclopedia of Chemical Technology,* Fourth Edition, Volume 14, pp. 985–1012, the disclosure of which is herein incorporated by reference. Suitable processes for preparing suitable acetals and ketals for the present invention are disclosed in, for example, *Advanced Organic Chemistry,* Second Edition, by Jerry March, 1977, pp. 810–812, the disclosure of which is herein incorporated by reference.

In general, suitable aromatic amine group containing compounds of the present invention have molecular weights of less than about 500, preferably less than about 400, and more preferably less than 200. Suitable aromatic amine group containing compounds include, for example, those compounds wherein at least 1 amine group is, and preferably 1 to 3 amine groups are, attached to an aromatic ring, and the aromatic ring may be substituted or unsubstituted. Suitable substituents for the aromatic ring include, for example, alkyl groups having from 1 to 18 carbon atoms which may be branched or linear such as, for example, methyl, ethyl, propyl, etc.; aromatic groups having from 6 to 13 carbon atoms such as, for example, phenyl, aminophenyl, and diaminophenyl; and arylalkyl groups having from 7 to 12 carbon atoms such as, for example, methylene (aminophenyl), 2-(aminophenyl)butyl, etc. Suitable substituents for the aromatic ring also include hydroxyl groups. Aminophenol is one example of a compound wherein the aromatic ring is substituted with an hydroxyl group. Also, suitable as the aromatic amine group containing compound of the present invention are fused ring systems containing from 10 to 20 carbon atoms. Diaminonaphthalene is one example of a suitable fused ring system for the present invention.

Examples of suitable aromatic amines for the present invention include compounds such as aniline, diaminobenzene, triaminobenzene, tetraaminobenzene, tetraaminobiphenyl, methylene dianiline, crude toluenediamine (i.e., a mixture of the various isomers), and ortho-toluenediamine (i.e., an isomeric mixture of primarily 2,3-TDA and 3,4-TDA in a weight ratio of about 60 to about 40). Ortho-toluenediamine and crude toluenediamine are preferred aromatic amines in the present invention.

The preparation of suitable amines for the present invention is well known to those skilled in the art. For instance, suitable amines can be prepared by dinitrating toluene with nitric acid in the presence of sulfuric acid or other catalyst to yield isomers of dinitrotoluene, which are then reduced with hydrogen to yield crude toluenediamine. (See, for example, *Kirk-Othmer Encyclopedia of Chemical Technology,* Fourth Edition, "Amines by Reduction", Volume 2, pp. 483–501, and "Nitrobenzene and Nitrotoluenes", Volume 17, pp. 133–151.) Crude TDA is a mixture of the various isomers, i.e., 2,3-TDA, 2,4-TDA, 3,4-TDA, 2,5-TDA, and 2,6-TDA.

In the process of the present invention, discoloration of aromatic amines is prevented or minimized by adding a small quantity of a compound selected from the group consisting of aldehydes, ketones, acetals and ketals to aromatic amines as soon as possible after the formation and subsequent purification of these amines. The time after an amine is prepared and the point in time at which the addition of a small quantity of one of these compounds is necessary to be effective in preventing discoloration of the amine ultimately depends on the stability of the particular amine with respect to discoloration and how well it is protected from contact with air.

Some relatively stable amines such as, for example, aniline, darken slowly over time while other amines are relatively unstable and darken immediately upon exposure to air. Ortho-toluenediamine is one example of a relatively unstable amine which darkens immediately when exposed to air. Accordingly, the point at which the stabilizing compound (i.e., aldehyde, ketone, acetal or ketal) is added to the amine to prevent discoloration may vary. It is, however, preferred that a small quantity of an aldehyde, ketone, acetal or ketal is added to the amine immediately following distillation. The stabilizing compounds may be added at a later point, if the freshly prepared amine is kept oxygen-free under an inert gas, such as, for example, nitrogen or argon. Once the stabilizing compound(s) has been added to the aromatic amine compound, the resultant composition is relatively stable in terms of color changes.

Typically, in a conventional process, when the nitrogen system fails or a leak occurs in the system protecting the amine group containing compound from exposure to air, the amine group containing compound begins to darken. Ortho-toluenediamine and crude TDA, the preferred amine group containing compounds, start to darken immediately upon exposure to air. The presence of a stabilizing agent such as, for example, paraformaldehyde, helps protect the color of the amine compound until the nitrogen can be restored.

It is, of course, possible to form polyether polyols wherein the previously described aromatic amines treated with a small quantity of a compound selected from the group consisting of aldehydes, ketones, acetals and ketals are the initiators instead of conventional untreated aromatic amines. A polyether polyol prepared from the color stable aromatic amine has a lighter color than a polyether polyol prepared from an untreated aromatic amine. Polyether polyols based on these treated aromatic amine initiators in accordance with the present invention can be prepared by any of the known processes such as are described in, for example, U.S. Pat. Nos. 4,209,609 and 4,421,871, the disclosures of which are herein incorporated by reference, and as described in British Patent 1,398,185. In general, the amine-initiated polyether polyols of the present invention are prepared by reacting an alkylene oxide with an amine having an amine functionality of at least 1 in the presence of an alkaline catalyst.

The suitable amine initiators for preparing polyether polyols include those previously described which have been treated with a compound selected from the group consisting of aldehydes, ketones, acetals and ketals. Some examples of alkylene oxides useful in producing the polyether polyols of the present invention include: ethylene oxide, propylene oxide, butylene oxide, and mixtures of these alkylene oxides. Combinations of ethylene oxide and propylene oxide are particularly preferred. In principle, any alkaline material capable of catalyzing the epoxidation reaction of the present invention may be used. Specific alkaline catalysts which have been found to be particularly suitable include, for example, potassium hydroxide and sodium hydroxide.

In general, the epoxidation reaction occurs by contacting the amine having an amine functionality of at least 1 with the alkylene oxide(s) at an elevated temperature in the range of from 90° to 180° C. under moderately elevated pressure in the presence of the alkaline catalyst. The amounts of amine and alkylene oxide which are used are generally 1 to 10 equivalents of alkylene oxide for each equivalent of amine. The epoxidation product generally has an average hydroxyl value (determined by ASTM D-2849-69 hydroxyl number method C) of at least 225, preferably in the range of from about 250 to about 1200. The molecular weights of the polyether polyols of the present invention (number average determined by end group analysis and nominal functionality of the polyol) generally range from about 150 to about 1500, preferably from about 300 to about 1200, most preferably from about 400 to about 1000.

After the polyol has been prepared, the resultant reaction mixture which contains the alkaline catalyst in amounts of from about 0.1% to about 1.0% as KOH is neutralized with an acid such as, for example, sulfuric acid, phosphoric acid, lactic acid or oxalic acid. Neutralization may be accomplished by mixing the acid and reaction mixture at ambient conditions with stirring, then distilling to remove any excess water. The neutralized polyether polyol need not have a pH of exactly 7.0. The reaction mixture may be maintained at a slight acidity or alkalinity, i.e., at a pH of from 5 to 11, preferably from 6 to 10. If the salt formed is soluble in the polyol, it may be left in. Otherwise, the salt can be removed by, for example, filtration.

The neutralized polyether polyol reaction mixture of the present invention is clear, i.e., free from haze and may be used directly in processes for the production of polyurethane foams. Methods for the production of polyurethane foams by reacting these polyether polyols with polyisocyanates via the polyisocyanate addition process are well known to those in the art.

The following examples further illustrate details for the preparation and use of the compositions and processes of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

EXAMPLE 1

100 g. of freshly distilled ortho-toluenediamine (o-TDA) were placed in a flask. To this, 0.6 g. of acetone was added, followed by mixing thoroughly. The sample was sealed, and placed in a 100° C. oven, along with a sealed sample of 100 g. of untreated, freshly distilled ortho-toluenediamine (see Example 11 in Table 1). After 24 hours, the untreated sample had a Gardner color=9, but the treated sample had a Gardner color of 6. After 48 hours, the untreated sample of o-TDA was opaque black (i.e., the Gardner color was>18), whereas the sample treated with acetone still had a Gardner color of 6. After 4 weeks, the color of the o-TDA treated with acetone was a Gardner 9.

EXAMPLES 2–10

These examples were performed using an essentially identical procedure as set forth under Example 1, with the exception of the particular stabilizing compound which was added to the freshly distilled o-TDA and the amount of each stabilizing compound. Specific stabilizing compounds and the relative quantity of each, as well as the result on the Gardner color after storage in a 100° C. oven for 24 hours, 48 hours, and for 4 weeks are shown in Table 1 below.

TABLE 1

EFFECT OF TREATMENT OF O-TDA WITH ADDITIVES ON GARDNER COLOR

| Example | Additive | Weight (grams) | Gardner Color[1] | Gardner Color[2] | Gardner Color[3] |
|---|---|---|---|---|---|
| 1 | acetone | 0.6 | 6 | 6 | 9 |
| 2 | benzaldehyde | 1.0 | 8 | 8 | 8 |
| 3 | butyraldehyde | 0.7 | 5 | 5 | 6 |
| 4 | dimethoxymethane | 0.8 | 10 | 10 | 18 |
| 5 | formaldehyde (37%) | 0.8 | 1 | 1 | 1 |
| 6 | glutaraldehyde (25%) | 2.0 | 5 | 5 | 5 |
| 7 | glyoxal (40%) | 1.5 | 12 | 12 | 12 |
| 8 | paraformaldehyde | 0.5 | 3 | 3 | 2 |
| 9 | salicylaldehyde | 1.2 | 11 | 11 | 11 |
| 10 | trioxane | 0.3 | 8 | 8 | 8 |
| 11 | untreated | — | 9 | >18 (opaque black) | >18 (opaque black) |

[1]: represents color after storage for 24 hours in a 100° C. oven.
[2]: represents color after storage for 48 hours in a 100° C. oven.
[3]: represents color after storage for 4 weeks in a 100° C. oven.

Although the o-TDA treated with dimethoxymethane in Example 4 above had a Gardner 18 after 4 weeks, this represents a transparent red color. By comparison, the untreated o-TDA was an opaque black color which is completely off the Gardner scale.

EXAMPLE 12

Polyether polyols were prepared from treated o-TDA and untreated o-TDA.

Polyether Polyol A

A polyether polyol was prepared from the treated o-TDA described in Example 8 above according to the following procedure. 2680 g. of this material was charged to a stirred reactor which was sealed, purged with nitrogen, and pressurized to 30 psig with nitrogen. The material was heated to 115° C., and 3339.3 g. of ethylene oxide were slowly added to the reactor over 2 hours, then allowed to react for an additional 2 hours. The mixture was cooled to 90° C. and 50.0 g. of a 46% aqueous potassium hydroxide solution was added. After sealing and pressurizing the reactor, it was again heated to 115° C., followed by slowly adding 5683 g. of propylene oxide over 4 hours, and then allowed to react for an additional 3 hours. After cooling to 90° C., 1200 g. of water were added and the KOH was neutralized with an equivalent of sulfuric acid. The polyol was heated at 110° C. and 5 mm Hg to reduce the water content and the material was filtered to remove the potassium sulfate salt which was generated. The resultant polyol was characterized by a color of <1 on the Gardner scale (APHA=160). Physical properties of this polyether polyol is Example 12a in Table 2.

Polyether Polyol B

By comparison, a polyol prepared using the same process as set forth above with the exception of using an untreated amine was characterized by a color of >18 (based on the Gardner scale).

The physical properties of these two polyether polyols are set forth in Table 2. These demonstrate that the treated amine compounds of the present invention do not adversely effect important characteristics of the resultant polyether polyols.

TABLE 2

PHYSICAL PROPERTIES OF POLYETHER POLYOLS

| Example | Viscosity (cps) | OH Number |
|---|---|---|
| Polyether Polyol A | 9,192 | 394 |
| Polyether Polyol B | 9,615 | 395 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable toluenediamine composition comprising:
   a) from 0.001 to 5% by weight, based on 100% by weight of component b), of a compound selected from the group consisting of aldehydes, aliphatic ketones, acetals, and ketals, and
   b) an isomer of toluenediamine or a mixture of isomers of toluenediamine.

2. The composition of claim 1, wherein said aliphatic ketone is selected from the group consisting of acyclic aliphatic ketones, cycloaliphatic ketones, methylalkylketones, dialkylketones, unsaturated aliphatic ketones and aliphatic diketones.

3. The composition of claim 1, wherein said toluenediamine comprises ortho-toluenediamine.

4. The composition of claim 1, wherein a) is selected from the group consisting of formaldehyde, paraformaldehyde, trioxane, acetaldehyde, butyraldehyde, glutaraldehyde, benzaldehyde, acetone and dimethoxymethane.

5. A process for stabilizing the color of toluenediamine comprising:
   1) adding from 0.001 to 5% by weight, based on 100% by weight of b), of a) a compound selected from the group consisting of aldehydes, aliphatic ketones, acetals, and ketals, to b) an isomer of toluenediamine or a mixture of isomers of toluenediamine.

6. The process of claim 5, wherein said aliphatic ketone is selected from the group consisting of acyclic aliphatic ketones, cycloaliphatic ketones, methylalkylketones, dialkylketones, unsaturated aliphatic ketones and aliphatic diketones.

7. The process of claim 5, wherein said toluenediamine comprises ortho-toluenediamine.

8. The process of claim 5, wherein a) is selected from the group consisting of formaldehyde, paraformaldehyde, trioxane, acetaldehyde, butyraldehyde, glutaraldehyde, benzaldehyde, acetone and dimethoxymethane.

9. A process for the production of a polyether polyol comprising alkoxylating an isomer of toluenediamine or a mixture of isomers of toluenediamine, wherein said toluenediamine is treated with from 0.001 to 5% by weight, based on 100% by weight of toluenediamine, with a compound selected from the group consisting of aldehydes, aliphatic ketones, acetals and ketals.

10. The process of claim 9, wherein said aliphatic ketone is selected from the group consisting of acyclic aliphatic ketones, cycloaliphatic ketones, methylalkylketones, dialkylketones, unsaturated aliphatic ketones and aliphatic diketones.

11. The process of claim 9, wherein said toluenediamine comprises ortho-toluenediamine.

12. The process of claim 9, wherein a) is selected from the group consisting of formaldehyde, paraformaldehyde, trioxane, acetaldehyde, butyraldehyde, glutaraldehyde, benzaldehyde, acetone and dimethoxymethane.

13. A polyether polyol produced by the process of claim 9.

14. A polyether polyol produced by the process of claim 11.

15. A polyether polyol produced by the process of claim 12.

* * * * *